United States Patent
Hussain et al.

(10) Patent No.: US 8,342,035 B2
(45) Date of Patent: Jan. 1, 2013

(54) CORIOLIS MASS FLOWMETER WITH MOUNTING ASSEMBLY HAVING CENTER OF GRAVITY LYING IN THE REFERENCE OSCILLATION PLANE

(75) Inventors: Yousif Hussain, Weston Favell (GB); Tao Wang, Rough Common (GB)

(73) Assignee: Krohne AG, Basel (CH)

( * ) Notice: Subject to any disclaimer, the term of this patent is extended or adjusted under 35 U.S.C. 154(b) by 340 days.

(21) Appl. No.: 12/767,039

(22) Filed: Apr. 26, 2010

(65) Prior Publication Data

US 2011/0154914 A1 Jun. 30, 2011

(30) Foreign Application Priority Data

Dec. 29, 2009 (DE) .................. 10 2009 060 834

(51) Int. Cl.
*G01F 1/84* (2006.01)
(52) U.S. Cl. ................. 73/861.355; 73/861.357
(58) Field of Classification Search ........................ None
See application file for complete search history.

(56) References Cited

U.S. PATENT DOCUMENTS

| | | | | |
|---|---|---|---|---|
| 4,738,143 A | * | 4/1988 | Cage et al. | 73/861.355 |
| 4,738,144 A | * | 4/1988 | Cage | 73/861.355 |
| 4,895,031 A | * | 1/1990 | Cage | 73/861.355 |
| 6,516,674 B1 | | 2/2003 | Poremba | |
| 7,077,014 B2 | | 7/2006 | Rieder et al. | |
| 7,337,676 B2 | * | 3/2008 | Hussain et al. | 73/861.357 |
| 2006/0021449 A1 | | 2/2006 | Hussain et al. | |
| 2007/0151368 A1 | * | 7/2007 | Hussain et al. | 73/861.357 |
| 2010/0132480 A1 | * | 6/2010 | Bitto et al. | 73/861.357 |
| 2011/0016991 A1 | | 1/2011 | Pankratz et al. | |
| 2012/0048034 A1 | * | 3/2012 | Hussain et al. | 73/861.357 |

FOREIGN PATENT DOCUMENTS

| | | |
|---|---|---|
| EP | 0 553 939 B1 | 6/1996 |
| EP | 1 431 720 A1 | 6/2004 |
| WO | 87/01444 A1 | 3/1987 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A Coriolis mass flowmeter having at least one measuring tube assembly (1) and at least one mounting assembly (2), wherein the mounting assembly (2) includes at least one bracket (3) mounted on the measuring tube assembly (1) and at least a part of an actuator assembly (4) and/or a sensor assembly (5) supported by the bracket (3) for oscillation generation and/or oscillation compilation so that measuring tube assembly (1) can be excited into oscillation in a reference oscillation plane (X-plane). The Coriolis mass flowmeter oscillation behavior is improved for increasing the quality of measurements by the center of gravity of the mounting assembly (2) being set in the reference oscillation plane.

8 Claims, 3 Drawing Sheets

CORIOLIS MASS FLOWMETER WITH MOUNTING ASSEMBLY HAVING CENTER OF GRAVITY LYING IN THE REFERENCE OSCILLATION PLANE

BACKGROUND OF THE INVENTION

1. Field of the Invention

The invention relates to a Coriolis mass flowmeter having at least one measuring tube assembly and at least one mounting assembly, wherein the mounting assembly includes at least one bracket mounted on the measuring tube assembly and at least one part of an actuator assembly and/or a sensor assembly supported by the bracket for oscillation generation and/or oscillation compilation, wherein the measuring tube assembly can be excited into oscillation in a reference oscillation plane (X-plane).

2. Description of Related Art

Mass flowmeters that work according to the Coriolis principle have, in general, at least one actuator assembly, with which the measuring tube arrangement is excited to oscillation, as well as is usual two sensor assemblies, with which the achieved oscillation or the achieved oscillations is or are measured. The the mass flow can then be determined using the phase shift between the oscillations each measured by both sensor assemblies.

The actuator assembly and the sensor assembly are usually built so that they, for example, have a permanent magnet as well as a magnetic coil in order to transfer (action of force) oscillations to the measuring tube assembly or to measure oscillations in the measuring tube assembly electrically. The oscillation behavior of the measuring tube assembly and the mounting assembly directly influences the quality of the measurement, so that, for example, deviations of the oscillation of the measuring tube assembly from the reference oscillation plane negatively influence the measurements received by the sensor assembly. Already at the point of establishing an oscillation on the measuring tube assembly, oscillation components deviating from the reference oscillation plane can be caused by the actuator assembly.

SUMMARY OF THE INVENTION

Based on the Coriolis mass flowmeters known until now from the prior art, it is a primary object of the invention to provide a Coriolis mass flowmeter whose oscillation behavior is improved to increase the quality of the measurements.

Based on the Coriolis mass flowmeter described in the introduction, this object is achieved in that the center of gravity of the mounting assembly lies in the reference oscillation plane.

When designing a bracket with parts of an actuator assembly and/or a sensor assembly attached to it, it must be taken into consideration that the mounting assembly is balanced in such a manner that the center of gravity of the mounting assembly lies in the reference oscillation plane—called the X-plane in the following. The reference oscillation plane is the desired main oscillation plane of the measuring tube assembly in this case, namely, the oscillation plane in which the oscillation of the measuring tube assembly is mainly excited by the actuator assembly.

Due to constructional influences, for example, when the center of gravity of the mounting assembly does not lie in the reference oscillation plane, oscillation components occur in secondary direction planes, which negatively influence the measurements. Using a center of gravity of the mounting assembly lying in the reference oscillation plane, a uniform oscillation of the measuring tube assembly in the measuring plane is maintained. If the center of gravity were outside of the reference oscillation plane, a torsional moment, inter alia, caused by the oscillation would affect the measuring tube assembly, which also influences the oscillation on the sensor assembly. Oscillation components in secondary oscillation planes are avoided using the design according to the invention in that the center of gravity oscillates also within the reference oscillation plane during oscillation.

The design of the bracket, itself, has an essential influence on the position of the center of gravity of the mounting assembly since the bracket is the supporting part of the mounting assembly and a part of the actuator assembly and/or the sensor assembly is attached to it. The bracket essentially determines the geometry of the mounting assembly. In this manner, for example, the length of the bracket determines the span of the parts of the actuator assembly and/or the sensor assembly, which is why a change in the geometry of the bracket influences the center of gravity of the mounting assembly.

"Actuator assembly and/or sensor assembly" does not only mean that different components are attached to the brackets, but also that, for example, one and the same arrangement of components, e.g., coils and magnets, can act as actuator assembly for exciting an oscillation of the measuring tube assembly and as sensor assembly for receiving the oscillations of the measuring tube assembly. The oscillation is, for example, excited by the arrangement acting as actuator assembly, then the actuator assembly is turned off and the resulting oscillations of the measuring tube assembly are received by the arrangement acting as sensor assembly. Then, for example, the mass flow is determined by the measuring tube assembly from the measurements contained therein.

That the center of gravity of the mounting assembly lies in the reference oscillation plane can be realized, for example, by a point mass of the mounting assembly above the X-plane with a small mass, but with a long lever arm, that is balanced in terms of oscillation, for example, using a second point mass below the X-plane with a correspondingly shorter lever arm, but instead with a greater mass, so that the point of gravity of the mounting assembly formed by the two point masses lies in total in the reference oscillation plane. In particular, in the case of differing masses of the components of the actuator assembly and/or the sensor assembly, the geometrically asymmetrical design of the bracket is an essential factor for the distribution of weight within the mounting assembly.

According to a preferred design. Alternatively, it is provided that the first point mass of the part of the mounting assembly that lies above the reference oscillation plane and the second point mass of the part of the mounting assembly that lies below the reference oscillation plane each lie symmetrically mirrored relative to the reference oscillation plane. These point masses of the mounting assembly above and below the X-plane each have the same size span to the X-plane, so that the center of gravity of the mounting assembly formed by both point masses lies in the reference oscillation plane. Using the identical span of the point masses to the X-plane, it is implied at the same time—by the identical lever arm of the masses—that the point masses each have a same mass since, otherwise, the center of gravity of the mounting assembly cannot lie in the reference oscillation plane.

Here, the desired main oscillation direction of the measuring tube assembly for the measurement is to be understood as the reference oscillation plane. The measuring tube assembly is, here, a system of elements with flow that are to be set into oscillation and can, in particular, comprise a single or also two—preferably parallel—measuring tubes. In a Coriolis mass flowmeter having a measuring tube assembly, which has only a single measuring tube, the oscillation plane is the actual oscillation plane of the measuring tube assembly that is required for the measurement.

In a Coriolis mass flowmeter having a measuring tube assembly with multiple measuring tubes, it should be first taken into account that these multiple measuring tubes of the measuring tube assembly are mechanically linked to one another by the bracket of the corresponding mounting assembly. Consequently, it is to be distinguished in this case that the measuring tubes of the measuring tube assembly are arranged in such a manner that they oscillate in a common, identical plane, which easily correlates to the reference oscillation plane. When the multiple measuring tubes of the measuring tube assembly are arranged in the bracket so that their center lines oscillate in different, parallel planes during normal excitation, then the reference oscillation plane is a mathematical oscillation plane, which runs parallel to the actual oscillation planes. The determination of the location of the mathematical reference oscillation plane from the actual oscillation planes can occur simply by mathematically averaging the positions or also by weighted mathematical averaging, wherein the position of each of the multiple measuring tubes is weighted with the portion of the respective measuring tube related to the total flow, which in the simplest case corresponds to the ratio of the respective individual measuring tube cross section to the total flow cross section of the Coriolis mass flowmeter.

In case of the design of a Coriolis mass flowmeter having two measuring tube assemblies, the reference oscillation plane is determined in a similar manner. If each measuring tube assembly comprises only one measuring tube, then both measuring tubes usually run parallel to one another and oscillate in the plane opposite to one another, which is already defined by the parallel center line of the measuring tube, wherein this plane is then the reference oscillation plane. If each measuring tube assembly comprises two measuring tubes, wherein the respective plane that is defined by the center lines of the measuring tubes of each measuring tube assembly is perpendicular to the intended oscillation plane of each measuring tube, the reference oscillation plane lies averaged between the actual oscillation planes of both measuring tubes of the measuring tube assembly. In the case of a Coriolis mass flowmeter having a total of four measuring tubes, whose center lines are arranged in a rectangle, wherein respectively two measuring tubes are combined into one measuring tube assembly, two oscillation planes are defined by the measuring tube center lines of two oppositely oscillating measuring tube of different measuring tube assemblies, so that the reference oscillation plane is then the oscillation plane in the middle between both actual oscillation planes.

According to a preferred design of the Coriolis mass flowmeter of this application, it is provided that at least a first measuring tube assembly and a second measuring tube assembly are included, wherein a first mounting assembly includes at least a first bracket and a second mounting assembly includes at least a second bracket, wherein the first bracket is attached to the first measuring tube assembly and the second bracket is attached to the second measuring tube assembly, and the first bracket supports at least a first part of the actuator assembly and/or sensor assembly and the second bracket supports at least a second part of the actuator assembly and/or a second part of the sensor assembly, wherein the first measuring tube assembly and the second measuring tube assembly are excitable to oscillation in a reference oscillation plane (X-plane). The brackets are, here, preferably oppos- ingly attached to the measuring tube assembly, so that respectively the first part of the actuator assembly and/or the first part of the sensor assembly is attached to a bracket on a measuring tube assembly and the second part of a actuator assembly and/or a second part of the sensor assembly is attached to a second bracket on the second measuring tube assembly, so that both of the parts of an actuator assembly and/or a sensor assembly interact, so that respectively a complete actuator assembly and/or a complete sensor assembly is formed.

The first part and the second part of the actuator assembly and/or sensor assembly, here, are still independent of one another, so that when the measuring tube assemblies have an oscillation shifted to one another, the parts of the actuator assembly and/or the sensor assembly can receive the oscillation, or respectively, can excite the measuring tube assembly to oscillation.

So that the parts of the actuator assembly and/or sensor assembly can advantageously interact, it is provided by an advantageous design that the first measuring tube assembly and the second measuring tube assembly are designed symmetrically mirrored at a Y-plane essentially orthogonally oriented to the reference oscillation plane (X-plane). The Y-plane, thus, runs between both measuring tube assemblies, so that the center line running in the middle of the path between both measuring tube center lines lies in the Y-plane. Both measuring tube assemblies are, thus, arranged completely symmetrical to one another, which, in total, has a positive effect on the oscillation behavior of the Coriolis mass flowmeter.

It has been shown to be of particular advantage for the oscillation behavior of the Coriolis mass flowmeter when the first point mass of the first mounting assembly and the first point mass of the second mounting assembly lie symmetrically mirrored to the Y-plane and/or the second point mass of the first mounting assembly and the second point mass of the second mounting assembly lie symmetrically mirrored to the Y-plane. This design has the advantage that the point masses of the first and the second mounting assemblies balance one another in terms of oscillation, since they each have a same distance to the Y-plane.

This design is, in particular, of importance when, in the process of oscillation, portions of the oscillation result outside of the reference oscillation plane, which, for example, would be amplified due to a design that is not symmetrically mirrored, but are minimized due to the symmetrically mirrored design. The distance that has been shown to be of particular advantage for the distance of the point masses from the Y-plane corresponds to the distance of the center tube axes of the measuring tube of the measuring tube assembly from the Y-plane, so that the first point mass and the second point mass lie respectively essentially on a common axis with the center of the measuring tube cross section. In the case that this advantageous distance can not be kept, the deviation of the distance of the point mass from this distance should be as small as possible, wherein the deviation should also be identical for all point masses.

A particularly preferred design of a Coriolis mass flowmeter regarding the oscillation behavior provides that the common center of gravity of the first mounting assembly and the second mounting assembly lies in the Y-plane. When the common center of gravity of both mounting assemblies lies in the Y-plane, it lies, for example, exactly between two measuring tube assemblies. Since the center of gravity, here, additionally lies in the X-plane, the center of gravity is also not shifted in an oscillating measuring tube assembly, in particular, when two measuring tube assemblies oscillate in opposition, so that all in all a very uniform oscillation image is the result of this essentially static center of gravity, which positively affects the accuracy of measurement of the Coriolis mass flowmeter according to the invention. The common point mass is formed, in total, of the point masses of the mounting assembly. The position of the point mass is, here, determined by specific design of the bracket and by shifting the weight of the components attached to the bracket. The shape of the components and the type of mounting on the bracket are additionally influencing factors.

The centers of gravity of the mounting assembly can be easily balanced according to a further preferred design in that at least two parts of an actuator assembly and/or sensor assembly are held by a bracket, wherein, in particular, respectively a part of an actuator assembly and/or sensor assembly is provided above the X-plane and a second part of an actuator assembly and/or sensor assembly is provided below the X-plane. Additionally, preferably two identical parts of an actuator assembly and/or sensor assembly are attached to one, single first bracket above and below the X-plane, so that the point masses of the mounting assembly develop essentially symmetrically to the X-plane due to the uniform distribution of weight through the identical components. On a second bracket, which is arranged essentially opposite to the first bracket, for example, respectively, the second parts of an actuator assembly and/or sensor assembly are attached both above as well as below the X-plane.

The first parts of an actuator assembly and/or a sensor assembly attached to a first bracket are respectively the corresponding parts to the second parts of an actuator assembly and/or sensor assembly, which are attached to the second bracket, so that, due to the parts of the actuator assembly and/or sensor assembly on both brackets, respectively two complete actuator assemblies and/or sensor assemblies develop between both brackets, respectively one above and one below the X-plane.

The design described above is particularly suitable for two actuator assemblies, since the measuring tube assembly is thus uniformly excited by the actuator assemblies from both above and below the measuring tubes, without, for example, torsional moments occurring in the measuring tubes, which could negatively affect the oscillation behavior. This design having a double actuator assembly and/or sensor assembly can, for example, also be provided for a sensor assembly, so that two independent measurements regarding the oscillation can be taken from sensor assemblies arranged respectively above and below the measuring tube, so that two measurements independent of one another for the oscillation can be determined. Additionally, there is the advantage that, for example, the measurement error is suggested through the deviation of both measurements from one another, through which, in total, the accuracy of the oscillation measurement can be increased.

According to a preferred further design, it is provided that a part of an actuator assembly and/or a part of a sensor assembly is held on one side of the Xplane by a bracket, wherein at least one balancing weight is held by the bracket on the opposing other side of the X-plane. Due to this balancing weight, the point mass of the mounting assembly is influenced on the one side below the X-plane in such a manner that it develops symmetrically to the point mass of the part of the mounting assembly above the X-plane, so that the center of gravity of the mounting assembly lies, in total, in the reference oscillation plane—the X-plane.

The balancing weight can, for example, have a similar or same shape as an actuator assembly or sensor assembly. This design is suited in a particular manner for the sensor assembly, since when the measuring tube assembly is already in uniform oscillation, it is only necessary to measure the oscillation on one side of the X-plane. The sensor assembly has a uniform oscillation image due to the balancing weight with a bracket center of gravity lying at least in the X-plane.

It has been shown to be of particular advantage when the bracket is designed symmetrically to the X-plane. Since the mounting assembly is balanced by the balancing weight or, respectively, the actuator assembly and/or sensor assembly in such a manner that the center of gravity of the mounting assembly is found in the X-plane, the bracket itself can also be symmetrically designed.

Due to a symmetrically designed bracket, the parts of the actuator assembly and/or sensor assembly or, respectively the balancing weight have a same distance respectively to the X-plane and in particular, also the to Y-plane, so that according to a preferred design it is provided that the balancing weight has a respective weight that corresponds to the balancing weight of the bracket with the associated part of an actuator assembly or sensor assembly.

Depending on the used actuator assembly and/or sensor assembly, the weight of the balancing weight is adapted in such a manner that the center of gravity of the mounting assembly is found in the X-plane, preferably additionally also in the Y-plane. The balance weight does not additionally have to be identical in shape to the parts of the actuator assembly and/or sensor assembly, but must only be designed in such a manner that a corresponding positioning of the center of gravity is possible.

In order to flexibly compensate inaccuracies regarding the position of the point mass occurring during manufacture of the a Coriolis mass flowmeter, it is provided, according to a preferred design, that the distance of the point masses to the Y-plane is adjustable, in particular is adjustable, by re-positioning a part of the actuator assembly and/or a part of the sensor assembly and/or a balancing weight.

The components essentially influencing the position of the point masses, namely the actuator assembly, the sensor assembly, and respectively, the balancing weights can, for example, be positioned using a threading or a screwing device in respect to the Y-plane in such a manner that a re-positioning of the point masses results, through which, in total, the individual point masses of the mounting assembly can be synchronized. Even when, for example, due to changes of the tube system or other influences, a re-positioning of the point masses should result during operation, these inaccuracies can be adapted to the new operation situation by changing the position of the individual components in respect to the Y-plane.

In particular, in thin-walled measuring tube assemblies, for example, due to the oscillation excitation in addition to the actual oscillation of the entire measuring tube assembly in a reference oscillation plane, additional oscillations can occur in the cross section of the measuring tube assembly, i.e., for example, in the tube wall of a measuring tube, which is why, according to an advantageous example, that the bracket encircles the measuring tube assembly in a ring-like fashion, so that the cross-section of the measuring tube assembly is reinforced, wherein, in particular, the bracket is attached to the measuring tube assembly over the entire extent of the measuring tube assembly. The brackets, here, act as reinforcing elements for the walls of the measuring tube assembly, so that the tendency to oscillation in the cross section of the measuring tube assembly is substantially reduced.

Normally, multiple brackets are provided along the entire length of a measuring tube assembly, so that the measuring tube assembly is attached by the brackets in uniform distances, through which the described oscillations in the cross section of the measuring tube assembly are reliably prevented. The bracket is thus preferably attached to the measuring tube assembly over an entire circumference of the measuring tube assembly, i.e., for example, soldered or welded with the measuring tube assembly, so that a reliable material bond exists.

In order to prevent the influencing of oscillations, in respect to its point mass-balanced mounting assembly, due to bending of the mounting assembly or, respectively oscillation of the mounting assembly, by an advantageous further development, it is provided that the bracket is designed in such a manner that a first attachment angle $\alpha_1$ is smaller than or equal to a second attachment angle $\alpha_2$, wherein the first attachment angle $\alpha_1$ and the second attachment angle $\alpha_2$ indicate an extension of contact contours between a supporting ring and a support member of the bracket, wherein the first attachment angle $\alpha_1$ and the second attachment angle $\alpha$, are measured in a Z-plane defined by the contact contours, extending from the intersection of the Z-plane with an A-plane running perpendicular to the reference oscillation plane (X-plane) as well as to the Z-plane and through the center of the supporting ring.

The attachment angle $\alpha_1$ is extends toward the X-plane from the A-plane which is located on the center line or center of a supporting ring on an attachment side of a bracket thereof, and wherein the second attachment angle $\alpha_2$ extends from the A-plane on a side of the bracket facing away from attachment side. The attachment angles extend, here, into the Z-plane, which is respectively arranged orthogonally relative to the X-plane and the A-plane, wherein the A-plane is arranged essentially parallel to the Y-plane. The A-plane is shifted parallel to the Y-plane.

This preferred bracket includes essentially a central supporting ring, on which a support member is designed on two opposing sides, wherein the beginnings of the support member are formed on the supporting ring respectively at the intersection of the extended angle axis with the outer contour of the supporting ring, through which a particular reinforcement of the bracket results, which all in all has a positive effect on the oscillation behavior of the mounting assembly. A support member according to the corresponding requirements regarding contact contours is formed on the supporting ring, respectively on opposing sides above and below.

According to a particularly preferred design, which positively affects the oscillation behavior, it is provided that the attachment angles $\alpha_1$ and $\alpha_2$ are less than 90°, in particular less than 45°. According to a further preferred design, a positive oscillation behavior of the bracket or, respectively the mounting assembly has been seen when the attachment angle $\alpha_2$ is about 90°, wherein the attachment angle $\alpha_1$ is less than 90°, in particular less than 45°. In this design of the bracket, a particularly advantageous oscillation image results, in particular in the reference oscillation plane. In this design, it is also possible that the supporting ring of the bracket is partially open, in particular when the opening is aligned in the assembled state in the direction of a second measuring tube assembly.

The above-described designs of Coriolis mass flowmeters can preferably be produced with a method, in which, in the construction process of the Coriolis mass flowmeter, an orthogonal coordinate system is created in the area of the bracket, whose x-axis orthogonally intersects the center line of the measuring tube assembly in the area of the bracket and whose y-axis runs orthogonally to the center line of the measuring tube assembly and through the center of the path between the center lines, wherein the mounting assembly and/or the balancing weights are designed in such a manner that the point masses of the sections of a mounting assembly, which are respectively found in one of the four quadrants between the x-axis and the y-axis, have the same orientation in terms of magnitude.

Using such a method, the balancing of the point masses of the mounting assembly can already occur in the construction process, so that the common center of gravity of the first and the second mounting assembly is found between the two measuring tube assemblies in the X-plane and preferably also in the Y-plane.

In detail, there are a number of possibilities for designing and further developing the Coriolis mass flowmeter according to the invention as will be apparent from the following description of embodiments in conjunction with the accompanying drawings.

DETAILED DESCRIPTION OF THE INVENTION

Figure 1:
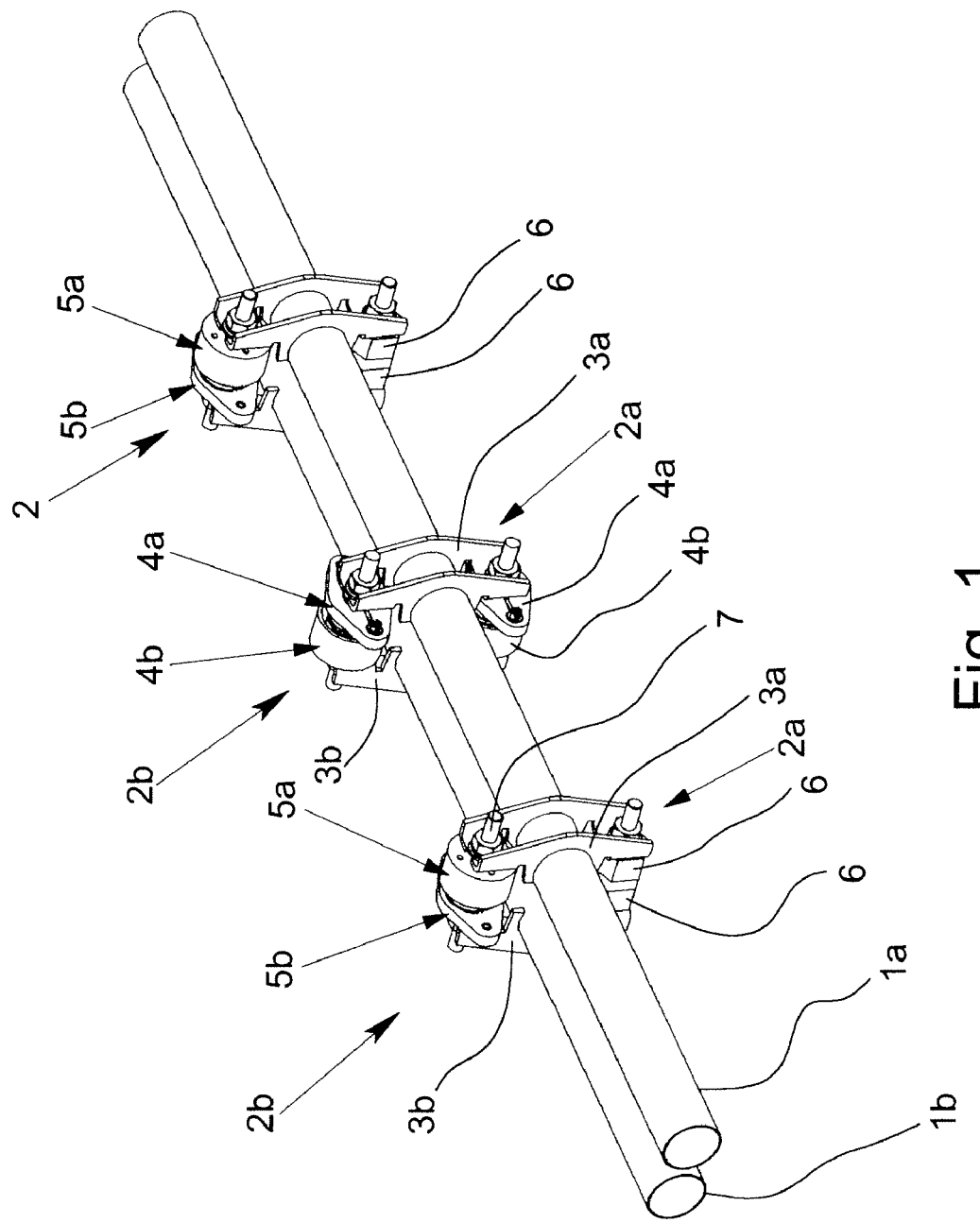
FIG. 1 is a perspective view of an embodiment having two measuring tube assemblies for a Coriolis mass flowmeter having mounting assemblies attached to it, in a perspective side view.

FIG. 1 shows a first measuring tube assembly 1a and a second measuring tube assembly 1b for a Coriolis mass flowmeter, wherein the measuring tube assemblies 1a, 1b are arranged parallel to one another. A number of mounting assemblies 2a, 2b are attached on each of the measuring tube assemblies 1a, 1b, wherein a number of first mounting assemblies 2a is attached to the first measuring tube assembly 1a and a number of mounting assemblies 2b is attached to the second measuring tube assembly. Each mounting assembly 2 comprises a bracket 3 attached to a measuring tube assembly 1 and a part of an actuator assembly 4, or a part of a sensor assembly 5 supported by the bracket 3, wherein the actuator assembly 4 acts as an oscillation generator and the sensor assembly 5 as oscillation sensor.

The actuator assemblies 4 each comprise a first part 4a of an actuator assembly 4 and one second part 4b of the actuator assembly 4, wherein the sensor assembly 5 comprises a first part 5a of a sensor assembly 5 and a second part 5b of a sensor assembly 5.

In FIG. 1, shown in the middle, are two mounting assemblies 2 arranged opposite one another, each attached to a measuring tube assembly 1 by their bracket 3, wherein each mounting assembly 2 supports a respective two parts 4a, 4b of an actuator assembly 4, so that two symmetrically arranged actuator assemblies 4 are arranged above and below the measuring tube assembly 1 for oscillation generation. Consequently, a first mounting assembly 2a supports two first parts 4a of an actuator assembly 4, while a second mounting assembly 2b respectively supports two second parts 4b of an actuator assembly 4. The measuring tube assemblies 1 can be excited into oscillation in a reference oscillation plane (X-plane) with the actuator assemblies 4 formed in this manner, as is shown in FIG. 2.

Shown to the right and left of the mounting assemblies 2 shown in the middle in FIG. 1, two mounting assemblies 2 are respectively arranged, which are each attached to a measuring tube assembly 1 by their brackets 3. Here, each first mounting assembly 2a supports a first part of a sensor assembly 5a and a second mounting assembly 2b supports a second part of a sensor assembly 5b, so that a respective sensor assembly 5 for oscillation detection is arranged to the right and to the left of the actuator assemblies 4.

Figure 2:
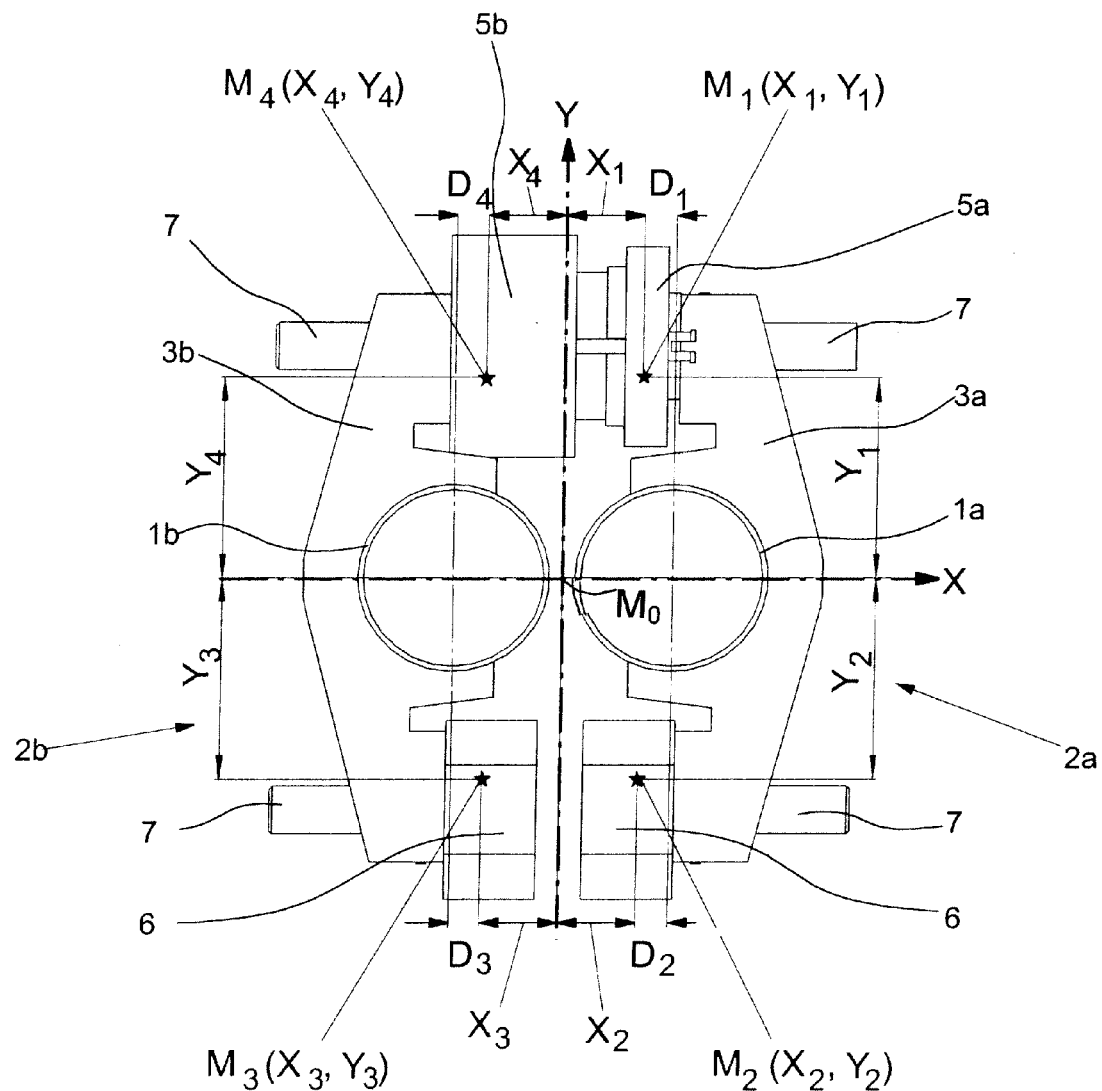
FIG. 2 is an end view of an embodiment of measuring tube assemblies of a Coriolis mass flowmeter having mounting assemblies attached to it.

The oscillations of the measuring tube assembly 1 should occur mainly in a reference oscillation plane (X-plane) shown in FIG. 2. FIG. 2 also shows a first mounting assembly 2a and a second mounting assembly 2b in an end view. The mounting assemblies 2a, 2b each include a bracket 3a, 3b attached to a respective mounting assembly 1a, 1b. A first part 5a of a sensor assembly 5 is attached to a first mounting assembly 2a and a second part 5b of a sensor assembly 5 is attached to a second mounting assembly 2b.

The first mounting assembly 2a shown in the right in FIG. 2 has a first point mass $M_1$ above the X-plane and a second point mass $M_2$ below the X-plane. Parallel to this, the second mounting assembly 2b shown on the left in FIG. 2 has first point mass $M_4$ above and a second point mass $M_3$ below the X-plane. Here, the X-plane runs exactly through the centers of the measuring tube assemblies 1a, 1b; the Y-plane runs orthogonally to the X-plane exactly midway between the first measuring tube assembly 1a and the second measuring tube assembly 1b so that the first measuring tube assembly 1a and the second measuring tube assembly 1b are symmetrically mirrored relative to one another in respect to the Y-plane. The X-plane is the reference oscillation plane, in which the measuring tube assemblies 1 are excited to oscillation by the actuator assembly 4.

The first point mass $M_1$—shown on the right in FIG. 2—of the first mounting assembly 2a and the first point mass $M_4$—shown on the left in FIG. 2—of the second mounting assembly 2b and also the second point mass $M_2$ of the first mounting assembly 2a and the second point mass $M_3$ of the second mounting assembly 2b are arranged respectively symmetrically mirrored relative to one another with respect to the Y-plane, so that the distances $X_1$, $X_2$, $X_3$, $X_4$ of the point masses $M_1$, $M^2$, $M_3$, $M_4$ relative to the Y-plane are identical.

Furthermore, the first point mass $M_1$ of the first mounting assembly 2a and the second point mass $M_2$ of the first mounting assembly 2a and also the first point mass $M_4$ of the second mounting assembly 2b and the second point mass $M_3$ of the second mounting assembly 2b are provided symmetrically mirrored relative to one another in respect to the X-plane. Consequently, the distances $Y_1$, $Y_2$, $Y_3$, $Y_4$ of the four point masses $M_1$, $M_2$, $M_3$, $M_4$ to the X-plane are also identical.

The four point masses not only have the same distances relative to the Y-plane and the X-plane, but also each have the same mass, so that the common center of gravity $M_0$ of the first mounting assembly 2a and the second mounting assembly 2b lies in the X-plane and also in the Y-plane, i.e. consequently exactly between the first measuring tube assembly 1a and the second measuring tube assembly 1b. Due to such a design, the common center of gravity $M_0$ lies exactly in the reference oscillation plane (x-plane), so that a very positive oscillation behavior of the mounting assemblies 2a, 2b attached to the measuring tube assemblies 1a, 1b results.

As is shown in FIG. 2, the position and the weight of each second point mass $M_2$, $M_3$ is determined by a balancing weight 6 on the mounting assembly 2. The balancing weights 6 are attached to the brackets 3 below the X-plane. Since the brackets 3 are designed symmetrically mirrored to the X-plane in this embodiment, the balancing weights 6 have a weight that corresponds to opposing first part 5a of the sensor assembly 5 arranged on the other side of the X-plane or the weight of the second part 5b of the sensor assembly, so that a symmetrically mirrored arrangement of the point masses $M_1$, $M_2$, $M_3$, $M_4$ in respect to the X-plane as well as in respect to the Y-plane results, in particular when the weight of the first part 5a of the sensor assembly 5 corresponds to the weight of the second part 5b of the sensor assembly 5.

Since the mounting assemblies 2a, 2b are balanced in respect to the position of the point masses $M_1$, $M_2$, $M_3$, $M_4$, a very advantageous and uniform oscillation image of the measuring tube assemblies 1a, 1b in the reference oscillation plane—the X-plane—results without the oscillations having a substantial influence due to the mounting assemblies 2 being attached to the measuring tube assemblies 1. The parts of the sensor assembly 5 and also the balancing weights 6 are each attached to the brackets 3 with a mounting device 7.

The mounting devices 7, here, are designed in such a manner that the distance $X_1$, $X_2$, $X_3$, $X_4$ of the point masses $M_1$, $M_2$, $M_3$, $M_4$ to the Y-plane can be set in a simple manner. Due to this adjustability of the distances $X_1$, $X_2$, $X_3$, $X_4$ of the point masses $M_1$, $M_2$, $M_3$, $M_4$ to the Y-plane, tolerance deviations and deviations resulting from the mounting situation or occurring during the production process can be advantageously compensated. In respect to the Y-plane, the point masses $M_1$, $M_2$, $M_3$, $M_4$ are preferably positioned, here, in such a manner that the distances of the point masses from the center tube axes of the measuring tube assembly 1 are as small as possible in the X-direction $D_1$, $D_2$, $D_3$, $D_4$, but, in particular, are identical for all four point masses $M_1$, $M_2$, $M_3$, $M_4$.

Figure 3:
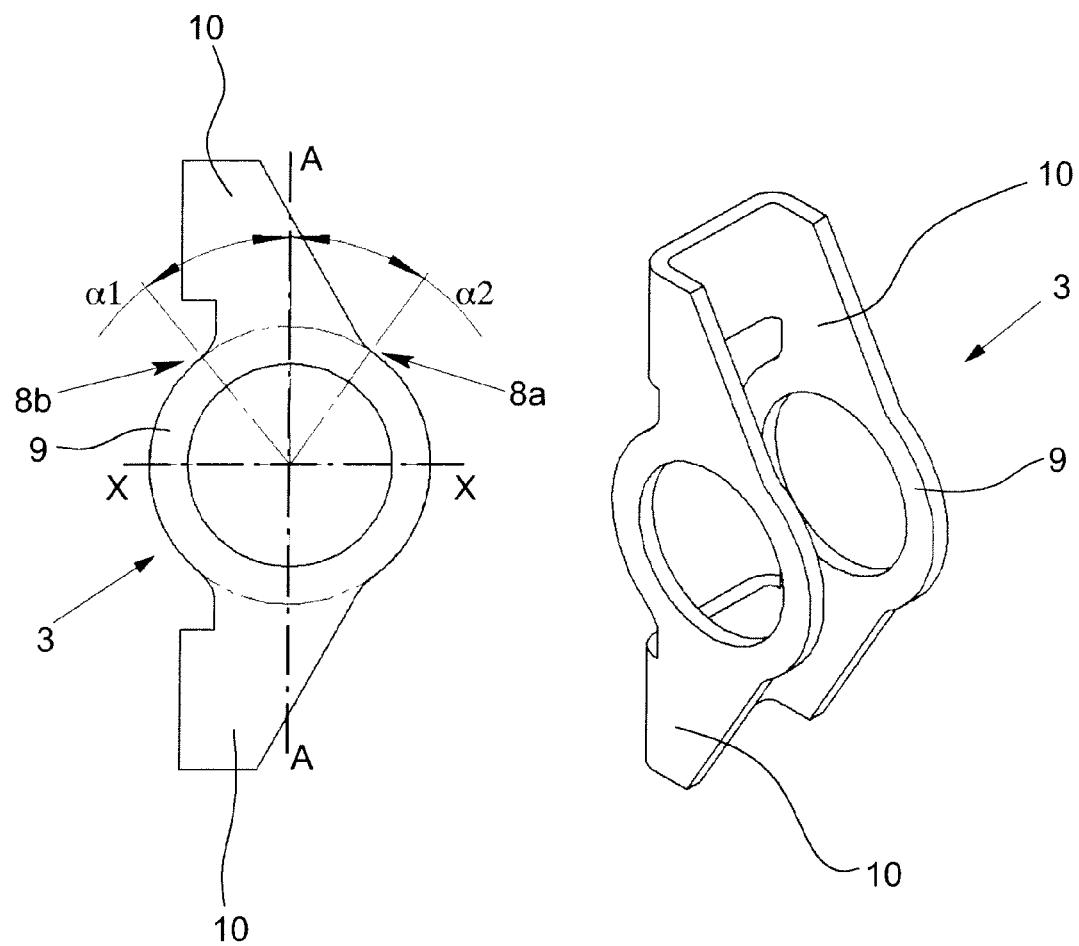
FIG. 3 shows an embodiment of a bracket for a Coriolis mass flowmeter in a side view and in a perspective side view.

FIG. 3 shows a preferred embodiment of a bracket 3, which has an advantageous stiffness that affects the oscillation behavior of the measuring tube assembly 1 positively, in particular, in a system with balanced point masses $M_1$, $M_2$, $M_3$, $M_4$. In this embodiment, the attachment angle $\alpha_1$ is the same as an attachment angle $\alpha_2$, wherein the first attachment angle $\alpha_1$ and the second attachment angle $\alpha_2$ indicate the extension of contact contours 8 between a supporting ring 9 and a support member 10 of the bracket 3, wherein the first attachment angle $\alpha_1$ and the second attachment angle $\alpha_2$ are measured in a Z-plane defined by the contact contours 8, from the intersection of the Z-plane with the A-plane.

In other words, the attachment angles $\alpha_1$ and $\alpha_2$ indicate a respective angle extending from the center axis of a measuring tube assembly and the A-plane, and which describe the extension of a support member 10 between a first contact contour 8a and a second contact contour 8b on the supporting ring 9. The A-plane runs parallel to the Y-plane, but is shifted parallel to the Y-plane, so that it runs through the center of the supporting ring 9. The Z-plane is orthogonal to the A-plane, the X-plane and the Y-plane, i.e., parallel to the plane of the paper relative to the side view of FIG. 3.

In the embodiment according to FIG. 3, the attachment angles $\alpha_1$ and $\alpha_2$ are each somewhat smaller than 45°, by which an advantageous stiffness of the bracket results. The brackets 3 according to FIG. 2 have, here, respectively an attachment angle $\alpha_1$, which is somewhat smaller than 45°, wherein the attachment angle $\alpha_2$ is about 90°; for this embodiment an advantageous stiffness of the brackets 3 was also shown in operation.

Due to the above-described embodiments, the bracket 3 obtains an advantageous stiffness, so that it is not bent or deformed and does not vibrate due to the oscillations of the measuring tube assembly 1 in the reference oscillation plane, which would influence the measurements of the parts of an actuator assembly 4 and/or sensor assembly 5 attached to the bracket 3.

What is claimed is:
1. Coriolis mass flowmeter, comprising:
at least one measuring tube assembly and
at least one mounting assembly, wherein the mounting assembly includes at least one bracket mounted on the at least one measuring tube assembly and at least one part of one of an actuator assembly and a sensor assembly supported by the bracket, wherein the measuring tube assembly is excitable into oscillation in a reference oscillation plane, wherein the center of gravity of the mounting assembly lies in the reference oscillation plane wherein the at least one measuring tube assembly comprises at least one first measuring tube assembly and at least one second measuring tube assembly, wherein the at least one mounting assembly comprises a first mounting assembly with at least one first bracket and a second mounting assembly with at least one second bracket, wherein the first bracket is attached to the first measuring tube assembly and the second bracket is attached to the second measuring tube assembly, wherein the first bracket supports at least a first part of at least one of the actuator assembly and the sensor assembly, wherein the second bracket supports at least a second part of at least one of the actuator assembly and the sensor assembly, wherein the first measuring tube assembly and the second measuring tube assembly are excitable to oscillation in the reference oscillation plane, wherein the first measuring tube assembly and the second measuring tube assembly are symmetrically mirrored relative to a Y-plane that is oriented essentially orthogonally relative to the reference oscillation plane, and wherein a first point mass of the first mounting assembly and a first point mass of the second mounting assembly lie symmetrically mirrored relative to the Y-plane and a second point mass of the first mounting assembly and a second point mass of the second mounting assembly lie symmetrically mirrored relative to the Y-plane.

2. Coriolis mass flowmeter according to claim 1, wherein the first and second mass points are located symmetrically mirrored relative to the reference oscillation plane.

3. Coriolis mass flowmeter according to claim 1,
wherein the at least one measuring tube assembly comprises at least one first measuring tube assembly and at least one second measuring tube assembly, wherein the at least one mounting assembly comprises a first mounting assembly with at least one first bracket and a second mounting assembly with at least one second bracket, wherein the first bracket is attached to the first measuring tube assembly and the second bracket is attached to the second measuring tube assembly, wherein the first bracket supports at least a first part of at least one of the actuator assembly and the sensor assembly, wherein the second bracket supports at least a second part of at least one of the actuator assembly and the sensor assembly, and wherein the first measuring tube assembly and the second measuring tube assembly are excitable to oscillation in the reference oscillation plane.

4. Coriolis mass flowmeter according to claim 3, wherein the first measuring tube assembly and the second measuring tube assembly are symmetrically mirrored relative to a Y-plane that is oriented essentially orthogonally relative to the reference oscillation plane.

5. Coriolis mass flowmeter according to claim 4, wherein the first point mass of the first mounting assembly and the first point mass of the second mounting assembly lie symmetrically mirrored relative to the Y-plane and the second point mass of the first mounting assembly and the second point mass of the second mounting assembly lie symmetrically mirrored relative to the Y-plane.

6. Coriolis mass flowmeter comprising:
at least one measuring tube assembly and
at least one mounting assembly,
wherein the mounting assembly includes at least one bracket mounted on the at least one measuring tube assembly and at least one part of one of an actuator assembly and a sensor assembly supported by the bracket, wherein the measuring tube assembly is excitable into oscillation in a reference oscillation plane, wherein the center of gravity of the mounting assembly lies in the reference oscillation plane, wherein at least two parts of at least one of an actuator assembly and a sensor assembly are held by a bracket, wherein at least a part of the actuator assembly and a part of the sensor assembly is located above the X-plane and a second part of at least one of the actuator assembly and the sensor assembly is provided below the reference oscillation plane, and wherein the bracket is configured such that a first attachment angle is less than or equal to a second attachment angle, wherein the first attachment angle and the second attachment angle indicate an extension of contact contours between a supporting ring and a support member of the bracket, wherein the first attachment angle and the second attachment angle are measured in a Z-plane defined by the contact contours, extending from an intersection of the Z-plane with an A-plane running perpendicular to the reference oscillation plane and to a Y-plane extending through the center of the supporting ring essentially orthogonally relative to the reference oscillation plane.

7. Coriolis mass flowmeter according to claim 6, wherein the attachment angles are less than 90°.

8. Coriolis mass flowmeter according to claim 6, wherein the second attachment angle is less than 45°.

* * * * *